US012692092B2

(12) United States Patent
Schöttelndreier et al.

(10) Patent No.: US 12,692,092 B2
(45) Date of Patent: Jul. 28, 2026

(54) METHOD FOR A PRODUCTION PLANT, SYSTEM AND PRODUCTION PLANT

(71) Applicant: Heye International GmbH, Obernkirchen (DE)

(72) Inventors: Ralf Schöttelndreier, Nienstädt (DE); Kai Bindewald, Stadthagen (DE)

(73) Assignee: Heye International GmbH, Obernkirchen (DE)

( * ) Notice: Subject to any disclaimer, the term of this patent is extended or adjusted under 35 U.S.C. 154(b) by 57 days.

(21) Appl. No.: 18/914,755

(22) Filed: Oct. 14, 2024

(65) Prior Publication Data
US 2025/0136384 A1 May 1, 2025

(30) Foreign Application Priority Data
Oct. 26, 2023    (DE) ..................... 10 2023 129 598.5

(51) Int. Cl.
| | |
|---|---|
| *B65G 43/08* | (2006.01) |
| *C03B 35/04* | (2006.01) |
| *G01V 8/14* | (2006.01) |

(52) U.S. Cl.
CPC .............. B65G 43/08 (2013.01); C03B 35/04 (2013.01); G01V 8/14 (2013.01); *B65G 2201/0244* (2013.01); *B65G 2203/0233* (2013.01); *B65G 2203/041* (2013.01); *B65G 2203/044* (2013.01); *B65G 2811/095* (2013.01)

(58) Field of Classification Search
None
See application file for complete search history.

(56) References Cited

U.S. PATENT DOCUMENTS

| | | | | |
|---|---|---|---|---|
| 5,291,131 A | * | 3/1994 | Suzuki ................. | G01B 11/043 |
| | | | | 324/206 |
| 8,403,129 B2 | * | 3/2013 | Borsarelli ............... | C03B 9/453 |
| | | | | 198/723 |
| 8,789,680 B2 | * | 7/2014 | Felgenhauer .......... | B65G 47/04 |
| | | | | 198/429 |
| 9,222,861 B2 | * | 12/2015 | Urbanzyk ................ | G01N 3/08 |
| 10,538,393 B2 | * | 1/2020 | Wagner ................... | B65G 43/10 |
| 2009/0288930 A1 | * | 11/2009 | Schafer ................ | B65G 47/261 |
| | | | | 198/810.01 |

(Continued)

FOREIGN PATENT DOCUMENTS

| | | | | |
|---|---|---|---|---|
| CN | 110814045 A | | 2/2020 | |
| DE | 10245323 B4 | * | 8/2006 | ............. F16G 13/02 |
| DE | 102010043057 A1 | | 5/2012 | |

*Primary Examiner* — Gene O Crawford
*Assistant Examiner* — Muhammad Awais
(74) *Attorney, Agent, or Firm* — Dority & Manning, P.A.

(57) ABSTRACT

A method for providing a conveying speed profile for a drive mechanism of a conveyor belt of a production plant including an IS machine for manufacturing glass containers and the conveyor belt for conveying the glass containers, wherein glass containers are placed on the conveyor belt and/or the conveyor belt conveys away glass containers, wherein position data of the glass containers on the conveyor belt are detected, wherein on the basis of the position data a belt elongation is determined, wherein the belt elongation relates to the individual belt segments of the conveyor belt and wherein the conveying speed profile for the conveyor belt is provided on the basis of the belt elongation.

10 Claims, 3 Drawing Sheets

(56)  References Cited

U.S. PATENT DOCUMENTS

Figure 1:
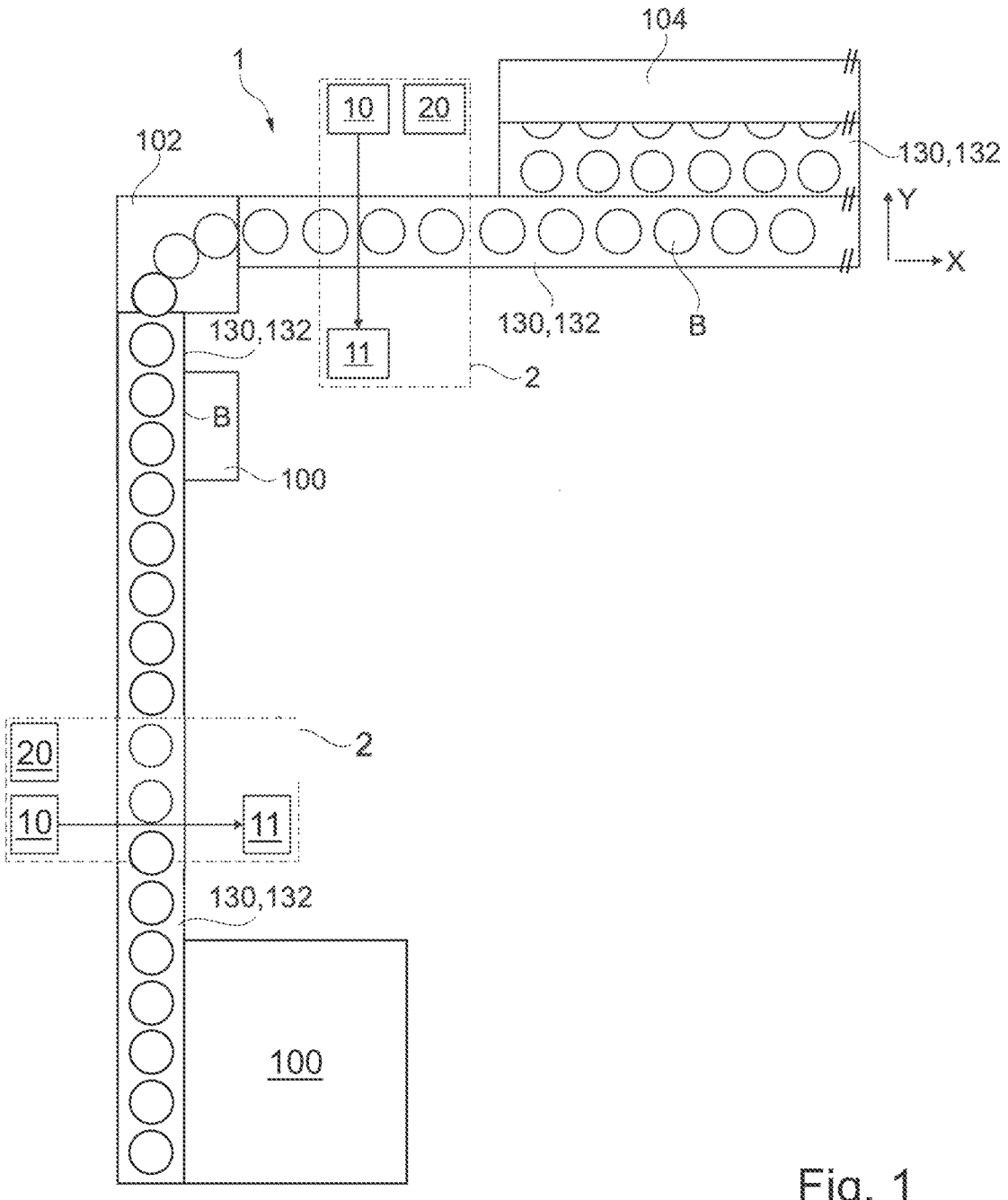

| | | | |
|---|---|---|---|
| 2011/0094853 A1* | 4/2011 | Kamps | B65B 21/06 |
| | | | 198/364 |
| 2013/0220776 A1* | 8/2013 | DePaso | B65G 43/06 |
| | | | 198/810.01 |
| 2013/0341156 A1* | 12/2013 | Vogeley, Jr. | B65G 43/08 |
| | | | 198/340 |
| 2014/0034456 A1* | 2/2014 | Gehring | G06K 7/10792 |
| | | | 198/810.01 |
| 2022/0410215 A1* | 12/2022 | Meadows | B65G 47/844 |

* cited by examiner

METHOD FOR A PRODUCTION PLANT, SYSTEM AND PRODUCTION PLANT

CROSS-REFERENCE TO RELATED APPLICATIONS

The present application is based upon and claims the right of priority to DE Patent Application No. 10 2023 129 598.5, filed Oct. 26, 2023, the disclosure of which is hereby incorporated by reference herein in its entirety for all purposes.

The invention relates to a method for a production plant, wherein the production plant comprises an IS machine for manufacturing glass containers and a conveyor belt with a drive mechanism for conveying the glass containers. The invention also relates to a system for performing the method and a production plant with an IS machine, a system and a conveyor belt.

IS machines for manufacturing glass containers have already been known from the prior art for decades. The function of an IS machine is typically as follows:

Glass is melted in a tank. This is fed through a channel (feeder channel). At the end of the feeder channel is a glass outlet (spout). Inside the spout, the glass is homogenized by means of a stirrer or a rotating tube. The tube is also used for metering the glass outflow. A plunger presses the glass out of the spout. When the plunger is retracted a measured glass gob is cut off by a cutter.

The gob distributor feeds the gobs to the individual sections via metal channels. The container forming in an IS machine is a 2-stage forming process. In a first step a preform is pressed or blown. In a second step the preform is blown into the final container shape. In both steps of the process the preform and the container are cooled continuously. When thermal stability is achieved, the container is removed from the mold and placed on a settler plate. It continues to be cooled there to prevent the reheating and deformation of the container.

From the settler plates of the IS machine the containers are transported into a annealing lehr. First of all, the containers are pushed by a pusher from the settler plate to a machine conveyor. A light barrier and an ejector are installed on the machine conveyor, wherein, after the start of a section, the ejector removes containers, lubrication containers or other defective containers from the transport. A tempering tunnel is positioned after this on the machine conveyor, in which the containers are given a coating which reduces their scratch sensitivity. Then the containers are generally guided to a deflection corner. This changes the transport direction by 90° and reduces the distances between the containers. A transverse conveyor upstream of the annealing lehr entrance transports the containers to be fed into the annealing lehr. This process is carried out by a pusher which pushes the containers in rows across the width of the annealing lehr into the annealing lehr.

When the glass containers are fully formed, they are removed from the forming molds by a removal device, usually to transport them to a settler plate, on which they are cooled and from which they are pushed onto the machine conveyor. A conventional removal device of this kind is known. The known removal device is provided for example for use with a double gob machine, which comprises two extraction grippers and a carrier for the extraction grippers and a mechanism, which is arranged so that it can move the carrier to move the grippers back and forth between a pick-up position, in which the grippers can pick up molded glass articles from the molds of the machine, and a set-down position, in which the grippers can set down the glass articles, for example at a cooling station.

When using a take-out device of this kind, the distance between the removal grippers is determined by the distance between the mold cavities. Without further measures, the distance between the mold cavities would therefore also determine the distance between the glass containers on the settler plate. Conventional push-out mechanisms, which push the glass containers from the settling plate onto a conveyor belt, can change the distance of the glass containers on the conveyor belt from the distance on the settler plate by a suitable distance between the push-out fingers, but the extent to which this is possible is severely limited by the size and distance of the glass containers and the need to position the fingers between the glass containers. This limitation is even greater in a three-gob or four-gob machine than in a two-gob machine. Even if an attempt is made to adjust the distance, at least one of the ejection fingers will inevitably move relatively quickly when it touches the corresponding glass container, risking damage to the glass container.

With the increasing use of multi-gob machines and efforts to increase the operating speed of IS machines, it is also necessary to increase the conveyor speeds. However, one aim is also to adjust the conveyor speed in such a way that economic aspects are taken into account and that no problems arise with instability of the glass containers on the conveyor belt with increasing conveyor speeds. For this reason, the aim is usually to achieve a distance between the glass containers on the machine belt that is smaller than the distance between the finished molds. A smaller distance between the glass containers on the machine belt means that a lower conveying speed of the machine belt can be selected, which is beneficial for a stable and trouble-free transport of the glass containers.

In a drive mechanism with at least one drive element that can be driven for movement, in the movement of which at least one encoder can generate and evaluate path increments, a path calibration device that compensates for an operational elongation of the conveying element is provided for the drive element according to DE 10 2010 043 057 A1. According to the method, an elongation that occurs during operation is measured permanently and/or periodically either automatically and/or by user control on the basis of the distance increments and of through-signals at the drive element of provided markings and, if necessary, compensated for in a calculation when determining the position or distance of the drive element.

DE 102 45 323 B4 describes a method and a device for determining the speed of a chain-link conveyor belt. The essential feature here is that the belt is moved along a first and a second sensor, which are fixed in place at a predetermined distance from each other at the side of the belt and are designed to produce a signal that has a typical time dependence on the irregularities of the distance between the individual chain links and one of the sensors. By determining a signal portion originating from the first sensor and a signal portion originating from the second sensor, which have the same relative amplitude structure, a time difference between the two signal portions can be determined and, from this, together with the known distance between the two sensors, the speed of the belt. This can also be used to determine an elongation of the belt.

CN 1 10 814 045 A describes an automatic positioning control method for a hot-rolled coiling chain. The method comprises the following steps: measuring the actual length of each sub-chain of the chain; calculating and determining the average extended length of each sub-chain of the chain according to the actual length and the standard length of each sub-chain of the chain; calculating and determining a relative positional change value of the chain according to the average extended length and an actual displacement of a single operation of the chain, detected by a displacement measuring device installed on the chain; calculating and determining the position deviation of the chain according to the relative position change value and the displacement reference of the control system of the chain; calculating and determining an adaptive proportional position reference of a proportional controller according to the positional deviation and the proportional coefficient of the proportional controller in the chain control system, and adjusting the automatic control program of a chain control system based on the adaptive proportional position reference. According to the control method, when the chain is mechanically stretched, accurate positioning of a positioning saddle on the chain can still be achieved.

DE 20 2008 011 454 U1 describes a device for forming product groups from a stream of a plurality of identical items supplied by conveyor systems, with a feed conveyor and indexing feed elements on at least one pair of driven, endlessly circulating flexible drive elements, which feed elements engage in the product stream in a cyclic manner and transversely to the transport plane, at least one cross-beam being arranged on each of these pairs of flexible drive elements, on which crossbeams feed elements are held, at least three pairs of flexible drive elements being arranged within a device, wherein each of these pairs can be operated with its own speed profile.

The objective of the invention is to provide solutions in connection with IS machines in order to increase the operating speed, reduce scrap and improve the possibilities for monitoring.

This objective is achieved by the subject-matter of the independent claims. Preferred further developments of the invention are described in the dependent claims.

According to the invention, a method is thus provided for providing a conveying speed profile for a drive device of a conveyor belt of a production plant, wherein the production plant has an IS machine for manufacturing glass containers and the conveyor belt for conveying the glass containers, wherein glass containers are placed on the conveyor belt and/or the conveyor belt conveys glass containers, wherein position data of the glass containers on the conveyor belt are detected, wherein a belt elongation is determined on the basis of the position data and wherein the belt elongation relates to individual belt segments of the conveyor belt, wherein the conveying speed profile for the conveyor belt is provided on the basis of the belt elongation.

In other words, the method mentioned above for solving the problem is geared towards providing a conveying speed profile for the conveyor belt, for example in order to adjust the conveyor belt to the belt elongation of the conveyor belt in a targeted manner by varying the conveying speed in certain sections. The conveying speed profile includes in particular the curve of the conveying speed to be set in relation to the entire belt length of the conveyor belt, in order to convey the glass containers at approximately equal distances despite a wear-related belt elongation, for example. Preferably, a belt elongation is detected by means of the conveyor belt, in particular at a constant conveying speed, glass containers are conveyed away and by evaluating these glass containers with regard to their position in relation to one another and/or to the conveyor belt. The belt elongation is proposed to relate to individual sections of the conveyor belt so that a conveying speed profile can be derived that specifies a speed equalization during the conveying of the glass containers according to the section-wise elongation.

In the context of the invention, it has been recognized that a conveyor belt does not elongate uniformly over time due to wear, so that "long" and "short" belt segments are found one behind the other. In tandem machines or IS machines in a tandem arrangement, the conveyor belt consists of two sections in particular, so that the wear may be different there. In particular, the effective conveying speed for each section or belt segment of the conveyor belt changes because the sections are longer or shorter than the theoretically assumed dimensions. As a result, the glass containers may no longer be at an equal distance from one another. In the context of the invention, it has also been recognized that the adjustment of the conveying speed to the uneven elongation of the belt can be very easily implemented by observing the conveyor belt during operation with conveyed glass containers with regard to the position data of the glass containers. This results in the section-by-section elongation of the belt, from which a conveying speed profile for the conveyor belt can be derived.

The conveyor belt can be a machine conveyor but also a transverse belt.

The invention has the advantage of enabling the provision of a conveying speed profile that is suitable for compensating for wear-related and/or production-related belt elongation. The conveying speed profile can advantageously be sent to the drive mechanism of the conveyor belt as a new movement profile or received from it, so that the belt can be operated at an adjusted conveying speed. In particular, at least theoretically, the distance between the glass containers is approximately the same over the entire conveyor belt and the glass containers enter uniformly, for example into a deflection corner or towards the annealing lehr.

By compensating for the belt elongation of the conveyor belt, the start times of a pusher device, e.g. towards a lehr, can be controlled automatically. In particular, pusher start times can be controlled automatically in order to be able to push more reliably from the machine conveyor to the cross conveyor or from the cross conveyor to the lehr by means of a pusher or a pusher device.

The invention also enables information on belt elongation to be provided. Conclusions can be drawn about the wear of the conveyor belt. This makes it easy to see whether there is a need for action with regard to the wear of the conveyor belt.

In particular, the conveying speed profile is to be understood as a curve of the target speed and/or the rotational speed of the drive unit, whereby the curve preferably refers to the entire length of the conveyor belt or one full belt rotation. The conveying speed profile is repeated for each cycle of a conveyor belt revolution or a full belt revolution. Preferably, the conveying speed profile is provided on the basis of position data that has been recorded at a constant conveying speed.

A conveyor belt in the sense of the present disclosure preferably has an endless belt for conveying glass containers in particular in a straight and/or horizontal manner. The endless belt runs, for example, on the upper side in one direction and on the lower side in the opposite direction. The conveyor belt can be aligned in sections or completely horizontally, rising or descending. The conveyor belt or the endless belt is preferably made of a heat-resistant material for supporting the hot glass containers.

The conveyor belt is preferably composed of belt segments that are connected or fixed to one another in the circumferential direction of the conveyor belt. The belt segments can be rigid or flexible. The belt segments can be pivotally connected to one another, for example in the manner of links in a bicycle chain. For example, there is space on a belt segment for at least or at most one section of a glass container, wherein in particular on a plurality of consecutive belt segments, for example four or more, there is space for all sections of a glass container or for the entire glass container. In particular, a segment or part of the glass container that is monolithically connected to at least one other section/segment/part is to be understood as one section of the glass container.

Belt segments may be provided as conveyor segments for conveying the glass containers. Conveyor segments are preferably not directly driven.

Belt segments may be provided as connecting and/or drive segments, which are used to connect two other belt segments, in particular two conveyor segments, and which, in particular like the conveyor segments, are used to convey glass containers. Connecting and/or drive segments preferably have one or more engagement possibilities, which are aligned facing away from the glass containers and are intended for engagement by or in a drive wheel. The engagement possibility is preferably a projection that can be grasped by a toothed drive wheel. Connecting and/or drive segments are preferably driven directly.

In principle, all sections of the conveyor belt can be considered belt segments, provided that there may be individual elongation of the respective section. Individual belt segments do not necessarily have to be individually separable components of the conveyor belt.

Basically, a one-piece or monolithic conveyor belt can also be considered to have belt segments with different elongations. These belt segments then merge practically 'seamlessly' into one another.

The drive system of the conveyor belt preferably has a drive motor and a motor control for the drive motor. The motor control can control the drive motor on the basis of the conveying speed profile in order to compensate for the belt elongation in sections or segments. The drive system preferably has at least one drive wheel that is provided to engage the belt segments or conveyor segments.

The positional data are understood to mean, in particular, information about the movement and/or location of the glass containers, for example in the form of computer-processable data or information. The position data may, for example, directly or indirectly, i.e. openly stated or derivable by processing the position data, include information about the location of the glass containers on the conveyor belt or belt segment, the belt segment on which they are located, the distance to the next glass container, the speed at which they are traveling and/or whether the glass container is upright and/or damaged.

Belt elongation is understood to mean, in particular, a length deviation of individual and/or all belt segments from a nominal length due to wear and/or tolerance. Normally, the conveyor belt becomes longer during operation due to wear, unevenly across its length. However, it is also conceivable that the belt elongation relates to tolerance or production-related elongations or deviations from the nominal length. In particular, belt elongation is a parameter set that is inherent to the conveyor belt and is preferably recorded continuously. In principle, it can be assumed that the belt elongation increases over the service life of a conveyor belt.

Advantageously, at least one section of a single glass container is placed and/or conveyed per belt segment or per two adjacent belt segments. For example, the glass containers are pushed onto the conveyor belt, with each belt segment or each pair of belt segments being designed to remove a portion of the pushed-on glass containers. Two adjacent belt segments can form a pitch or distance in the range between 5 and 25 mm, in particular 12.7 mm±2 mm, in a circumferential direction of the conveyor belt. In practice, it is particularly advantageous that several adjacent belt segments can convey a whole glass container, with each of these belt segments being able to carry a portion accordingly. For example, two adjacent belt segments form a pitch or distance along the circumferential direction of half an inch, i.e. half of 2.54 cm or approximately 12.7 mm. A glass container can extend over several pitches (e.g. at least two, three or four), depending on its size or diameter when placed on the belt segments. This is particularly useful for generating highly reliable position data or information for providing the belt elongation. It also allows a wide range of glass containers to be handled flexibly.

Preferably, it is provided that the temporal and/or spatial distances between the glass containers being conveyed are determined on the basis of the position data. For example, when the glass containers are being conveyed, the temporal or spatial distance between the glass containers is measured. It is particularly advantageous to work with a clock generator, such as a light barrier, to provide the position data or distances. The position data can be evaluated with a view to the distance between the successive glass containers. The method is further developed in a preferred way by providing the conveying speed profile on the basis of the distances. The conveying speed profile can be derived particularly expediently from both the temporal and the spatial distances.

The distances between glass containers are preferably recorded as time differences between two consecutive glass containers. By means of a motor speed of the drive mechanism, a number of teeth on the drive pinion of the drive mechanism and the belt length when put into operation, the conveying speed profile can be derived or calculated and, in particular, sent to the drive mechanism. In particular, the belt length can be verified by means of pattern recognition of the time differences.

Preferably, the belt elongation is compensated for during operation of the conveyor belt by operating the conveyor belt faster in a section with an elongated belt segment than in a section with a belt segment that is shorter than the elongated belt segment. Accordingly, the conveying speed profile can be adapted by specifying an individual conveying speed for each section of the conveyor belt comprising at least one belt segment. Thus, the glass containers can be conveyed particularly evenly and with the greatest possible uniformity of spacing despite uneven belt elongation. This can also extend the useful life of the conveyor belt.

The conveying speed profile can be sent to the drive unit and/or retrieved by the drive mechanism. For example, the conveying speed profile can be provided, sent and/or retrieved in connection with the maintenance of the production plant. The conveying speed profile can also be provided, sent and/or retrieved regularly or automatically, in particular independently of maintenance.

In particular, it is proposed that the drive mechanism be operated based on the conveying speed profile. In this respect, the conveyor belt can be operated at a variable conveyor speed over a full belt revolution, which compensates for the individual belt elongation. The glass containers are thus conveyed particularly evenly, for example between the IS machine and an annealing lehr. This can reduce scrap and increase productivity.

A system for performing the method is also proposed. The system has a sensor device for detecting the position data and a control device. The control device is set up to provide the conveying speed profile. The control device is connected to the sensor device, for example wirelessly or by cable, in particular for unidirectional or bidirectional communication with the sensor device. The control device can have an interface for communication, for example to retrieve and/or send the conveying speed profile, for example to a drive mechanism of the conveyor belt. In particular, the control device can also provide the conveying speed profile for retrieval, in particular by the drive mechanism and/or by an operator.

The system, in particular its sensor device, is advantageously arranged directly on a conveyor belt whose belt elongation is to be determined and on which position data are to be detected. In particular, the sensor device is arranged on a conveyor belt arranged downstream of an IS machine, such as a machine conveyor and/or a transverse belt.

The sensor device preferably comprises a light barrier and/or a camera and/or a distance sensor. The light barrier is aligned, for example, transversely to the conveying direction or laterally from the conveyor belt onto the glass containers. The camera can be arranged laterally or from above onto the conveyor belt in order to detect the glass containers. The distance sensor can be oriented like the light barrier or the camera.

The light barrier in particular comprises a light source, a light sensor and, if necessary, a reflector. The light barrier can detect when an object such as a glass container is in the path of the light emitted by the light source. The light barrier can provide the position data as a signal.

The camera is used in particular for capturing images of the glass containers. For example, an image sensor or CCD sensor and an optical system are provided to capture the glass containers optically by light and/or to generate image information as the position data. In particular, the camera is a digital camera. The camera can be provided with illumination for the glass containers. It is also possible to provide several cameras. Photos of the glass containers can be taken to provide the position data. The camera makes it possible advantageously to capture the actual situation during the conveying of the glass containers with particular accuracy, for example, to recognize the distances between the glass containers.

The distance sensor can comprise a radar sensor. The radar sensor can emit radar waves, in particular electromagnetic waves in the radio frequency range, which are reflected by objects such as a glass container, and receive these electromagnetic waves again. When conveyed glass containers pass through the detection range of the distance sensor, the distance between the glass containers can be determined. The distance sensor can provide the position data as a signal.

Based on the system it is possible to retrofit existing production plants so that the conveyor belt can be operated for longer and/or to improve production in terms of avoiding rejects and/or increasing productivity. The system is able to make the actual distances between the glass containers more even despite uneven belt elongation.

A production plant with an IS machine for manufacturing glass containers, a conveyor belt for conveying the glass containers and a system designed to provide a conveying speed profile that compensates for any local elongation of the conveyor belt, as described above, is also proposed. It is also possible to provide two or more of the systems, for example one system for each conveyor belt.

The invention makes it possible to detect so-called "pumping" or the irregular running of the conveyor belt, which can occur when a production plant with an IS machine and a conveyor belt is in operation. For example, the basis for a warning message can be created and/or a warning message can be sent.

The invention is explained in more detail in the following with reference to a preferred exemplary embodiment shown in the drawings.

Figure 2A:
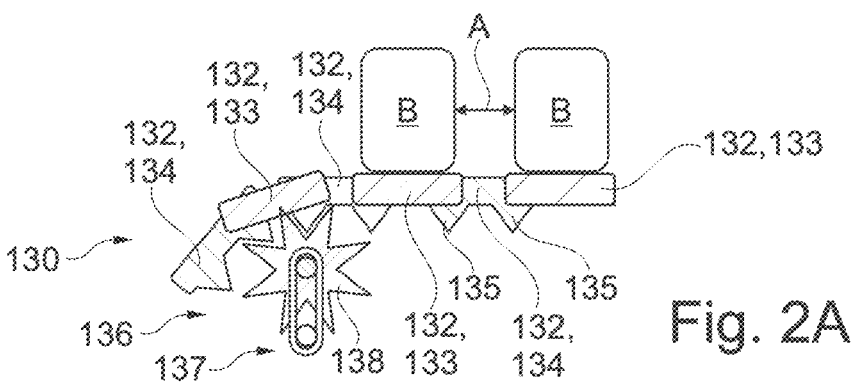
Figure 2B:
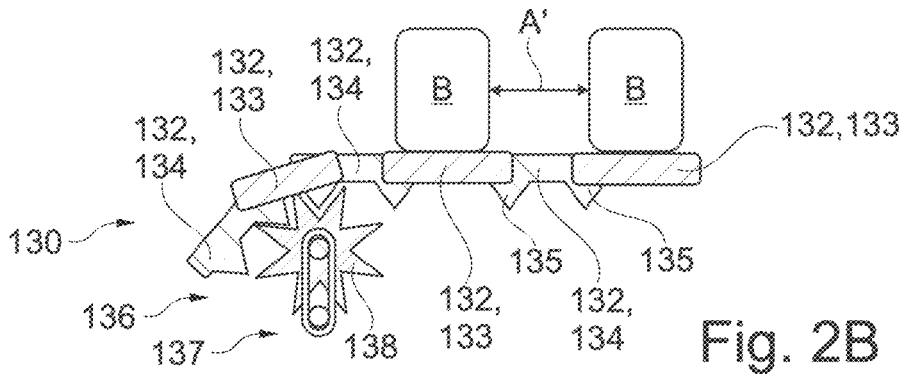
Figure 3:
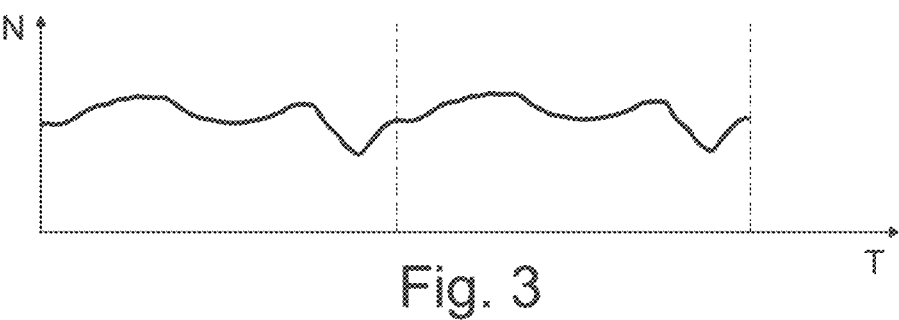
Figure 4:
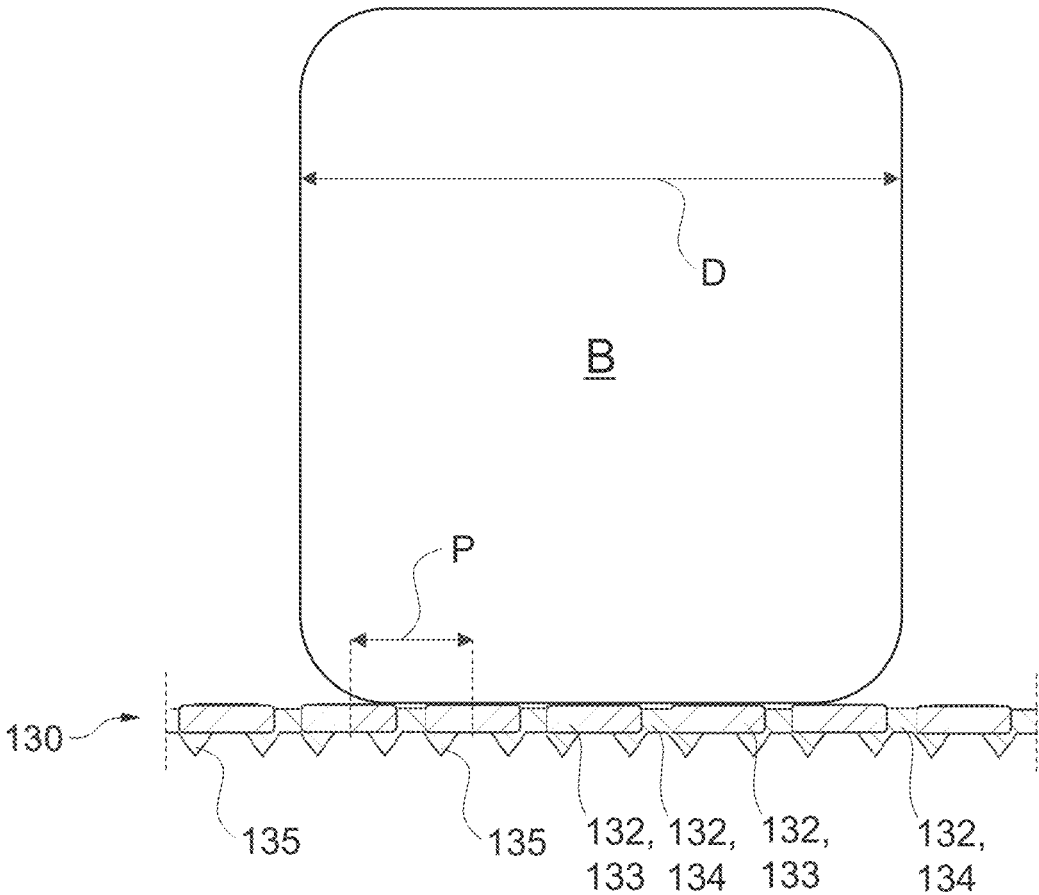

In the drawings:

FIG. 1 shows schematically a production plant according to a preferred exemplary embodiment of the invention in a plan view of an IS machine, a plurality of conveyor belts, a deflection corner, an annealing lehr and two systems, FIG. 2A-B show schematically a conveyor belt according to the preferred exemplary embodiment of the invention in a side view with a first belt elongation of belt segment (A) and with a second belt elongation of another belt segment (B), which is greater than the first belt elongation, FIG. 3 shows schematically a time-dependent progression of a speed of a drive motor of a conveyor, which was operated by a conveying speed profile that compensated for the belt elongation for two full belt revolutions, and FIG. 4 shows schematically a conveyor belt according to a further exemplary embodiment of the invention in a side view with a conveyed glass container.

FIG. 1 shows schematically a production plant 1 according to a preferred exemplary embodiment of the invention, which comprises an IS machine 100, a deflection corner 102 and an annealing lehr 104. Furthermore, a conveyor belt 130 is provided between the IS machine 100 and the deflection corner 102, which in the present case runs in direction Y and is generally referred to as a machine conveyor. In addition, a further conveyor belt 130 is provided between the deflection corner 102 and the annealing lehr 104, which runs in direction X and is referred to as a transverse belt. Finally, the annealing lehr 104 also has a conveyor belt 130 which runs in direction Y, in this case transversely or perpendicular to the previous conveyor belt 130, i.e. the transverse belt.

All of the conveyor belts 130 shown here are provided for conveying glass containers B. In this case, the glass containers B are glass bottles which have a round outline when viewed from above.

With regard to FIG. 1, each of the conveyor belts 130 is composed of belt segments 132. The belt segments 132 are each driven by at least one drive mechanism, not shown here. Typically, a glass container B is on each belt segment 132 or at least on each pair of belt segments 132.

If the glass containers B have been produced by the IS machine 100 shown in FIG. 1, they are conveyed away from the immediately downstream conveyor belt 130 (machine conveyor) to the deflection corner 102. At the deflection corner 102 the glass containers B accumulate and are conveyed away by the immediately downstream conveyor belt 130 (transverse belt). It is noteworthy here that an uneven or segmented belt elongation of a respective conveyor belt 130 when being conveyed away from the IS machine 100 and/or from the deflection corner 102 could lead to uneven spacing between the glass containers B, provided the respective conveyor belt 130 is operated at a constant speed of a drive motor or constant conveying speed. The uneven spacing between glass containers B that are still hot is generally problematic, for example because the glass containers B are not properly gripped by a pushing device or by a sliding device, which can result in rejects and/or disruptions to the manufacturing. However, in the present case, this problem does not occur or only occurs to a limited degree, because the wear-related, i.e. basically unavoidable belt elongation in some section or some segments is compensated for by the solution proposed here, for which reason here two structurally identical systems 2 are provided in particular.

In the present case, the production plant 1 comprises a system 2 on each conveyor belt 130. The system 2 is configured to provide a conveying speed profile. With the conveying speed profile the belt elongation of the respective conveyor belt 130 in some sections or some segments can be compensated for by the system 2, provided that the respective conveyor belt 130 is operated in accordance with this conveying speed profile, and in particular provided that the conveying speed profile has been provided according to the invention adjusted to the belt elongation.

In the present case, one of the systems 2 or its sensor device 10 is arranged on the transverse belt. The other system 2 and its sensor device 10 is arranged on the machine conveyor directly behind the IS machine 100. The respective system 2 can use a clock signal as a reference, for example.

In particular, a method for providing the conveying speed profile for optionally at least one, several or all conveyor belts 130 of the production plant 1 can be carried out with each of the present systems 2. In the method the respective conveyor belt 130 conveys the glass containers B, and position data of the glass containers B on the conveyor belt 130 are determined, wherein the belt elongation is determined on the basis of the position data, wherein the belt elongation relates to individual belt segments 132 of the conveyor belt 130, wherein the conveying speed profile for the respective conveyor belt 130 is provided on the basis of the belt elongation. In particular, in the method the respective conveyor belt 130 is operated at a constant conveying speed or speed of a drive motor in order to provide the conveying speed profile.

It is advisable to perform the method repeatedly, in order to counteract the belt elongation. For example, the method can be carried out daily or weekly, in particular if the production plant 1 is operated continuously.

For performing the method, the respective system 2 comprises a sensor device 10 with a reflector 11, wherein the sensor device 10 comprises a light barrier for detecting the glass containers B being conveyed past. When a glass container B passes the light barrier, the signal output by the light barrier changes as a component of position data relating to the glass containers B. The light barrier is aligned transversely to the conveying direction X of the conveyor belt 130 configured as transverse belt, i.e. in direction Y in FIG. 1. The sensor device 10 can detect the position data and send it to a control device 20. The control device 20 can calculate or derive the conveying speed profile from the position data.

In the present case, the control device 20 is configured to provide the conveying speed profile and to send it to a drive mechanism of a conveyor belt—in the present case with regard to FIG. 1—to the drive mechanism of the transverse belt. The control device 20 here has an interface that is configured for wireless or wired communication.

The time intervals between the conveyed glass containers B can be derived from the position data. This means for example that the belt elongation can be inferred in some segments, provided the distances vary from one another. It is possible to determine the overall belt elongation on the basis of all time intervals during a full rotation of the respective conveyor belt 130. In this way, the sequence of all time intervals is used to derive the conveying speed profile, wherein the respective conveyor belt 130 is to be operated faster in a section with an elongated belt segment 132 than in a section with a belt segment 132, which is shorter than the elongated belt segment 132. In other words, in the present case the respective conveyor belt 130 can be accelerated on the drive side in belt sections which have a greater elongation and can be braked at belt sections which have a lower elongation.

In the present case, the conveying speed profile is selected such that the conveyor speed of each belt segment 132 or several belt segments 132 is selected to be proportional to the time interval for each belt segment 132 or for each plurality of belt segments 132. If a time distance in a segment 132 or section is greater than average by a certain factor, the conveying speed in this segment or portion has to be increased by the said factor to compensate.

FIG. 2A and FIG. 2B show a side view of an example of a conveyor belt 130. The conveyor belt 130 is only depicted in some sections or segments and in the area with a drive mechanism 136. The conveyor belt 130 is composed of belt segments 132, 133, 134, wherein conveyor segments 133 and connecting and/or drive segments 134 for connecting the conveyor segments 133 are provided alternately. The belt segments 132, 133, 134 can all convey glass containers B and are configured for this purpose. A drive wheel 138 driven by a drive motor 137 engages with teeth in engagement options 135 of the connecting and/or drive segments 134. Depending on the individual belt elongation in the belt segments 132, 133, 134 a local and ultimately also temporal interval A is created between the glass containers B. For this, FIG. 2A illustrates an interval A with a normally elongated belt segment 132 and in contrast FIG. 2B shows an interval A' with a belt segment 132 that is more elongated due to wear on the same conveyor belt 130, but in a different section. In these illustrations, the conveyor belt 130 is operated at a constant conveying speed so that the shown difference in the distances A and A' is clearly present. If the respective drive mechanism 136 is operated with a conveying speed profile that compensates for belt elongation, the intervals A, A' in all sections of a conveyor belt 130 with individual belt elongation are approximately standardized or the same size.

FIG. 3 shows an example of a curve V of a speed N of a drive motor 137 of a drive mechanism 136 of a conveyor belt 130 over time T with two full rotations of the conveyor belt 130. It can be seen that the speed curve V repeats in line with the rotations. The speed varies over time. For example, a higher speed N is selected for elongated belt segments 132 than for less elongated belt segments 132. Basically, the time-dependent speed curve V can be understood as a component of a conveying speed profile. In addition, this speed curve V has to be implemented according to the location of the individually elongated belt segments 132, for which purpose the conveying speed profile regularly shows an assignment of the speed curve V to the rotational position of the conveyor belt 130, so that the individual speed N is always approached in the region of the correct segment 132. In addition to the curve V the mean value M of the curve V is shown, which is obtained over all full belt revolutions.

In principle, it is particularly advantageous if the speed N of the drive motor 137 of a drive mechanism 136 of a conveyor belt 130 with one full belt revolution, has deviations around a mean value M of the speed during the belt revolution or over time T, when the conveying speed profile is applied above a lower limit MIN of e.g. at least 50% and/or below an upper limit MAX of e.g. up to 150% of the mean value M. In particular, the speed N or its curve V should not leave the range set by the upper limit MAX and the lower limit MIN in order to ensure a reliable conveying. This avoids unwanted speed peaks.

It is preferred if the lower limit MIN is 75% and/or the upper limit is 125%. A lower limit MIN of 90% and/or an upper limit MAX of 110% is particularly preferred. In particular, no speeds should be outside the range described above, i.e. below the lower limit MIN or above the upper limit MAX, when a standardized operation of a conveyor belt 130 is performed with this drive motor 137.

In FIG. 3 the upper limit MAX for the speed curve V is around 110% and the lower limit MIN is around 80%, provided the mean value M is assumed to be 100%. In other words, in FIG. 3 the curve V of the speed N is above a lower limit MIN of at least 50% and/or below an upper limit MAX of up to 150% of the mean value M and does not leave the range set thereby.

FIG. 4 shows a side view of a further example of a conveyor belt 130, on which a glass container B is placed. Only sections or segments of the conveyor belt 130 are shown. The conveyor belt 130 is composed of belt segments 132, 133, 134, wherein conveyor segments 133 and connecting and/or drive segments 134 are provided alternately. The belt segments 132, 133, 134 are all provided for conveying glass containers B, wherein the connecting and/or drive segments 134 can additionally be driven on the underside or remote side of the glass containers B. A drive wheel 138 driven by a drive motor 137 and having teeth, which are not shown, here can engage in engagement options 135 of the connecting and/or drive segments 134.

FIG. 4 shows at least one section of the glass container B placed on each belt segment 132, 133, 134 or two adjacent belt segments 132, 133, 134 or is conveyed thereby. Two adjacent belt segments 132, 133, 134 have a pitch P or distance of about 12.7 mm in the circumferential direction of the conveyor belt 130. A plurality of adjacent belt segments 132, 133, 134 convey a whole glass container B, wherein each of these belt segments 132, 133, 134 carries a section of the glass container B. The glass container B extends over several pitches (here over at least four), according to its size D or its diameter which is supported substantially on or covers the belt segments 132, 133, 134.

LIST OF REFERENCE SIGNS

1 production plant
2 system
10 sensor device
11 reflector
20 control device
100 IS machine
102 deflection corner
104 annealing lehr
130 conveyor belt
132 belt segment
133 conveyor segment
134 connecting and/or drive segment
135 engagement option
136 drive mechanism
137 drive motor
138 drive wheel
A, A distance
B glass container D size
N speed
P pitch
T time
x direction
Y direction

The invention claimed is:

1. A method for providing a conveying speed profile for a drive mechanism of a conveyor belt of a production plant, wherein the production plant comprises an IS machine for manufacturing glass containers and the conveyor belt for conveying the glass containers, wherein glass containers are placed on the conveyor belt and/or the conveyor belt conveys away glass containers, wherein position data of the glass containers on the conveyor belt are detected, wherein a belt elongation is determined on the basis of the position data, wherein the belt elongation relates to individual belt segments of the conveyor belt and wherein the conveying speed profile for the conveyor belt is provided on the basis of the belt elongation.

2. The method according to claim 1, wherein at least one portion of an individual glass container is placed and/or conveyed away for each belt segment or each two adjacent belt segments, in particular wherein two adjacent belt segments form a pitch in the range between 5 and 25 mm in a circumferential direction of the conveyor belt.

3. The method according to claim 1, wherein time intervals and/or local distances of conveyed glass container from one another are determined on the basis of the position data.

4. The method according to claim 1, wherein the conveying speed profile is provided on the basis of the intervals.

5. The method according to claim 1, wherein the conveying speed profile is provided to compensate for the belt elongation during the operation of the conveyor belt, in that the conveyor belt is operated faster in a section with an elongated belt segment than in a section with a belt segment, which is shorter than the elongated belt segment.

6. The method according to claim 1, wherein the conveying speed profile is sent to the drive mechanism or is retrieved from the drive mechanism.

7. The method according to claim 1, wherein the drive mechanism is operated on the basis of the conveying speed profile.

8. A system for performing the method according to claim 1, with a sensor device for detecting the position data and with a control device, which is configured to provide the conveying speed profile.

9. The system according to claim 8, wherein the sensor device comprises a light barrier and/or a camera and/or a distance sensor.

10. The production plant comprising the IS machine for manufacturing glass containers, the conveyor belt for conveying the glass containers and the system configured for providing the conveying speed profile that compensates for belt elongation of the conveyor belt in some sections, wherein the system is configured according to claim 8 or the conveyor belt is configured to be operated on the basis of the conveying speed profile.

\* \* \* \* \*